(12) United States Patent
Wechsler et al.

(10) Patent No.: US 6,547,456 B2
(45) Date of Patent: Apr. 15, 2003

(54) PORTABLE SYSTEM FOR DIGITAL PHOTO MANAGEMENT

(75) Inventors: John L. Wechsler, Indianapolis, IN (US); John F. O'Brien, Ashburn, VA (US); Williams F. Collins, Jr., Columbus, IN (US)

(73) Assignee: Wishoo, Inc., Carmel, IN (US)

( * ) Notice: Subject to any disclaimer, the term of this patent is extended or adjusted under 35 U.S.C. 154(b) by 0 days.

(21) Appl. No.: 09/951,842

(22) Filed: Sep. 11, 2001

(65) Prior Publication Data

US 2002/0097333 A1 Jul. 25, 2002

(Under 37 CFR 1.47)

Related U.S. Application Data

(60) Provisional application No. 60/231,907, filed on Sep. 11, 2000, and provisional application No. 60/231,908, filed on Sep. 11, 2000.

(51) Int. Cl.[7] .............................................. G03B 17/00

(52) U.S. Cl. ....................... 396/422; 396/429; 348/157; 348/375; 348/552

(58) Field of Search ................................ 396/422, 429; 348/157, 158, 373, 375, 376, 552

(56) References Cited

U.S. PATENT DOCUMENTS

| 5,726,660 A | * | 3/1998 | Purdy et al. ................. 342/352 |
| 5,781,913 A | * | 7/1998 | Felsenstein et al. ......... 345/169 |
| 5,861,939 A | * | 1/1999 | Heacock ...................... 351/215 |
| 6,356,437 B1 | * | 3/2002 | Mitchell et al. ............. 342/352 |

* cited by examiner

*Primary Examiner*—David M. Gray
(74) *Attorney, Agent, or Firm*—Woodard, Emhardt, Naughton, Moriarty & McNett

(57) ABSTRACT

A system for digital photo management comprises: a harness; a digital camera; a computer control unit; a wireless data exchange component; a printer; and a battery. The computer control unit begins a process of printing a coupon associated with a digital photograph before the digital photograph has been completely downloaded from the digital camera.

1 Claim, 10 Drawing Sheets

PORTABLE SYSTEM FOR DIGITAL PHOTO MANAGEMENT

PRIORITY

This utility patent application claims priority from U.S. Provisional Patent Application Nos. 60/231,907 and 60/231,908, filed Sep. 11, 2000, the entire specification of which is hereby incorporated herein.

BACKGROUND

When people attend major sporting events, festivals, or other such events, they frequently like to have souvenirs by which to remember the event. Photographs are especially desirable souvenirs, since they are personalized to the individuals and the specific experiences and events of the day. However, the expense and inconvenience of taking a camera to such an event often cause people not to take photographs at such events. Consequently, some venders use cameras to take instant photographs which they sell to the attendees. Other, commercial souvenirs, such as tee-shirts, mugs, or other collectibles, are also popular, though they typically lack the personalized touch that photographs can provide.

Presently, it is possible to create the popular kinds of souvenirs, such as tee-shirts and mugs, that have a picture on them generated from a digital image. However, the equipment needed to produce such souvenirs is much more bulky and expensive than a mere camera suitable for making instant photographs. If there were a convenient and effective way to take pictures of people at such events, and then place them mugs, tee-shirts, etc., it would provide a souvenir combining the desirable features of each. In order to do this, a way to store the pictures for application to the souvenir items is needed, along with a way for the attendees to view the pictures that were taken of them (or their friends or family), and select which ones they would most like to have applied to the souvenir items.

Such major gatherings are also a popular place to advertise. In particular, coupons are frequently distributed, for example in the form of flyers. Because such coupon offers can be selected with demographic information about the likely attendees, they can be better tailored to appeal to the prospective consumer than is possible with some other types of coupon distributions, such as advertisements in periodicals such as newspapers or magazines. Because they are being distributed locally, it is also somewhat easier for prospective sponsors to tailor their offers to the area in which a prospective consumer is likely to be influenced to take advantage of the offer. By comparison, if a sponsor pays to place an add in a newspaper, depending on the nature of their business, it is likely that they will be paying for circulation to a substantial number of people who will not seriously consider taking advantage of the coupon offer because they live too far from the sponsor's establishment.

However, typical existing local distribution methods have offsetting shortcomings, as well. If the coupons are simply set out in flyers, they are much less likely to actually be picked up and read by a given attendee. On the other hand, if they are being manually distributed, the cost per coupon distributed is greatly increased. Furthermore, while such local distributions provide the sponsor with greater information about the time and location at which the coupon offers will be distributed, the actual coupons must still be generated in advance. Especially for larger events, which are otherwise the most desirable events at which to use local coupon distribution, the time information may be limited to certain days, rather than certain times of the day. Likewise, if the event is large enough that an attendee cannot conveniently walk from one end of the site to the other, the location information may not be specific enough to assure the optimum chance to influence the prospective consumer's behavior. Consequently, even with local couponing methods, unnecessary expense is typically incurred due to the need to produce more coupons than will actually be distributed.

Therefore what is needed is a way to take digital photographs of attendees at sporting or other events, and for the attendees to view those pictures and select from them which ones they would like to have applied to souvenir items, and simultaneously to distribute coupons having offers that are selected to be likely to appeal to the attendees of a particular event. The present invention is directed towards meeting this need, amongst others.

SUMMARY OF THE INVENTION

A first embodiment system according to the present invention comprises: a harness; a digital camera affixed to the harness; a computer control unit affixed to the harness; a wireless data exchange component affixed to the harness; a printer affixed to the harness; and a battery affixed to the harness. The computer control unit begins a process of printing a coupon associated with a digital photograph before the digital photograph has been completely downloaded from the digital camera.

DETAILED DESCRIPTION OF THE PREFERRED EMBODIMENT

Figure 1:
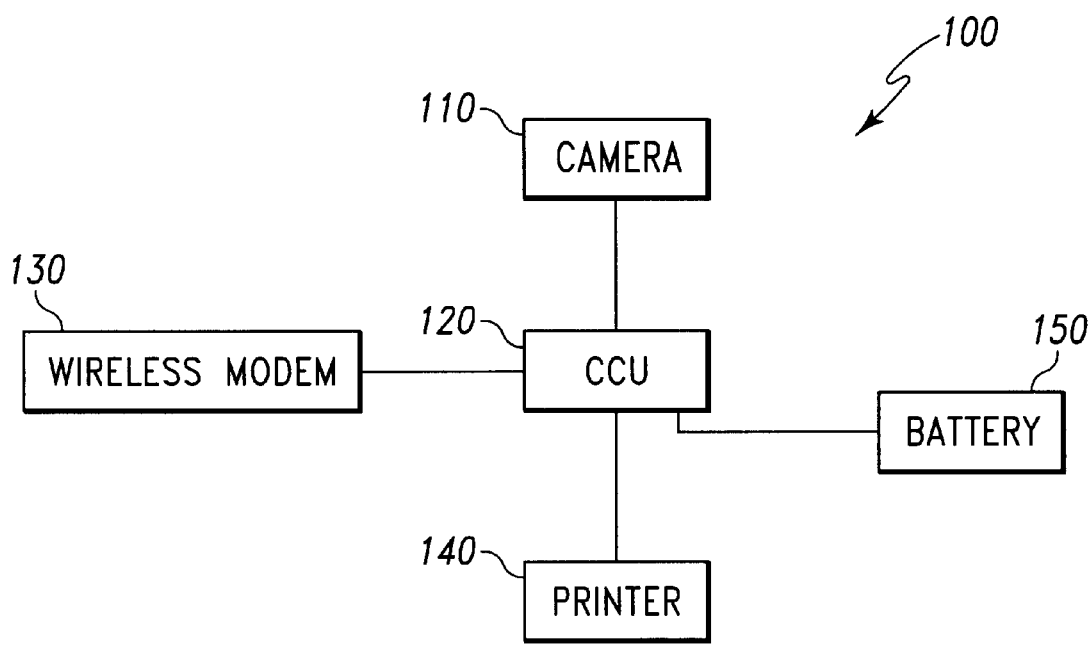
FIG. 1 is a block diagram of certain elements of the presently preferred embodiment portable system for creating and distributing digital photographs.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein, are herein contemplated as would normally occur to one skilled in the art to which the invention relates.

FIG. 1 is a block diagram of certain elements of the presently preferred embodiment portable system for creating and distributing digital photographs, indicated generally at 100. The system 100 comprises a digital camera 110, a computer control unit ("CCU") 120, a wireless data exchange component 130, a printer 140, and a battery 150. In the preferred embodiment, off-the-shelf components are used for each of these sub-systems, in order to minimize cost and facilitate maintenance. For example, in certain embodiments, a Kodak DC 290 Zoom Digital Camera is used for the digital camera 110, a Xybernaut Mobile Assistant IV (MA IV) wearable computer is used for the CCU 120, Sprint PCS Wireless Web Modem (also known as the Sierra Wireless Aircard 510) is used for the wireless data exchange 130, a Zebra Comtec Encore 2 Direct thermal printer (Model # E2H-0U1AV010-00 Rev B) is used for the printer, and a Power Bank MH-DPB 180M Ni-MH battery is used for the battery 150. (Note that in embodiments employing a MA IV 120, a Molicell Lithium Ion battery (Model # ME202A) is advantageously used for an independent power source. Also note that in embodiments employing a Kodak DC 290 Zoom Digital Camera, the resident software is advantageously replaced in order to substantially decrease the amount of time necessary to transfer digital images from the Camera 110 to the CCU 120, as described in greater detail hereinbelow.) In addition to these components, the presently preferred embodiment optionally includes a head-mounted display 160, such as a Xyberview Head Mounted Display (PArt # 734-77105-01). The system 100 also comprises software resident on the various hardware components, that controls the hardware components to facilitate the creation and distribution of digital photographs, as further described hereinbelow.

In the preferred embodiment, the remote units have the ability to integrate with various wireless networks with only minor software and hardware modifications, in order to exploit the enhancement, improvement, and proliferation of wireless networks likely in the future. In the presently preferred embodiment, only wireless CDMA technology is supported. Future embodiments will likely advantageously employ "plug and play", (i.e. plug in a different PCMCIA wireless card, and the Tech Pack recognizes and uses it as the wireless component 130). Specific wireless technologies that are likely to be advantageously supported by plug and play technology include: Bluetooth; 802.11b (Wireless LAN); GPRS (Global Packet Radio Service); CDPD; and other future wireless network technologies not yet developed or currently under development.

Figure 2:
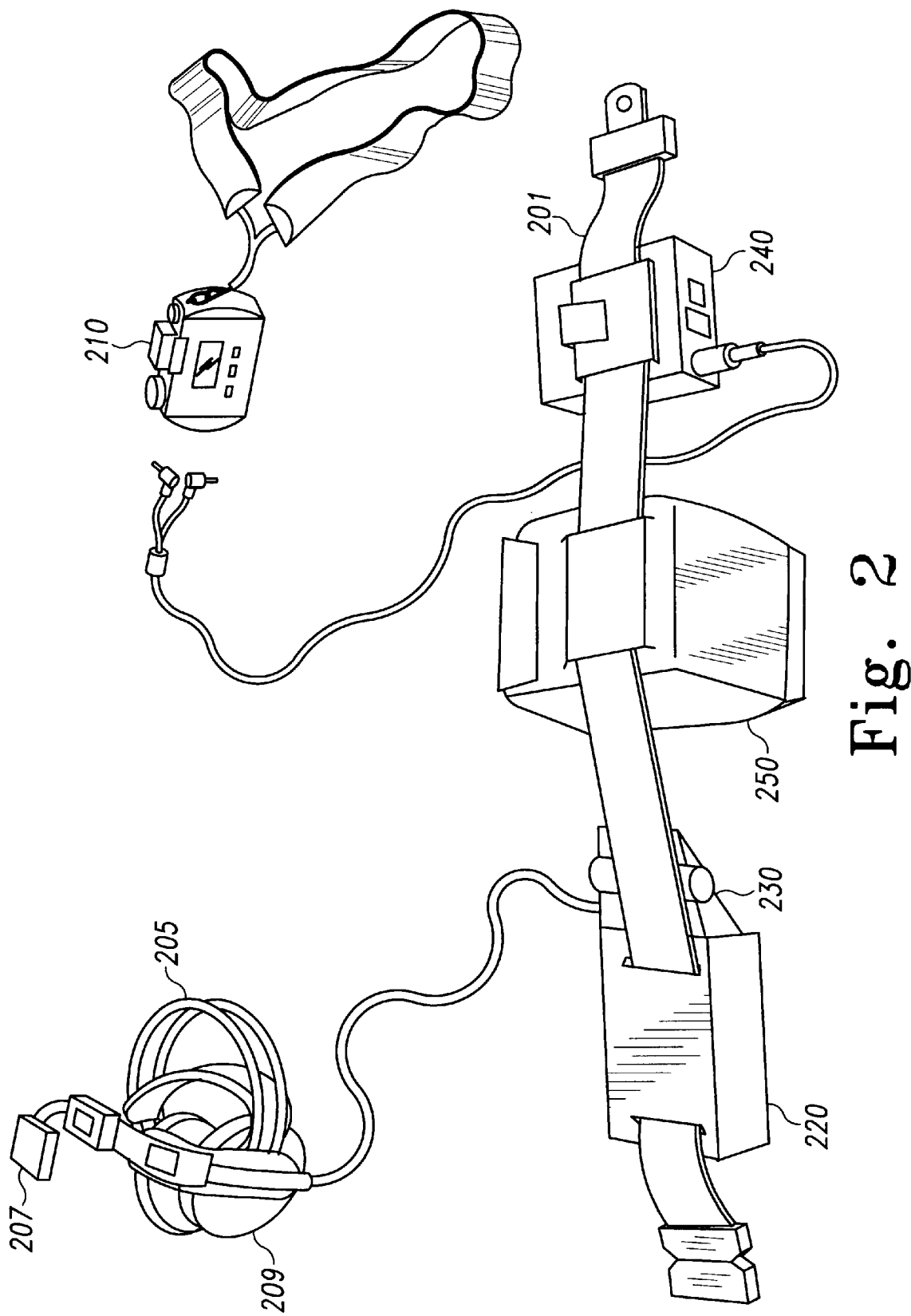
FIG. 2 is a plan view of showing the physical form of a system according to the present invention, laid out on a flat surface.
Figure 3:
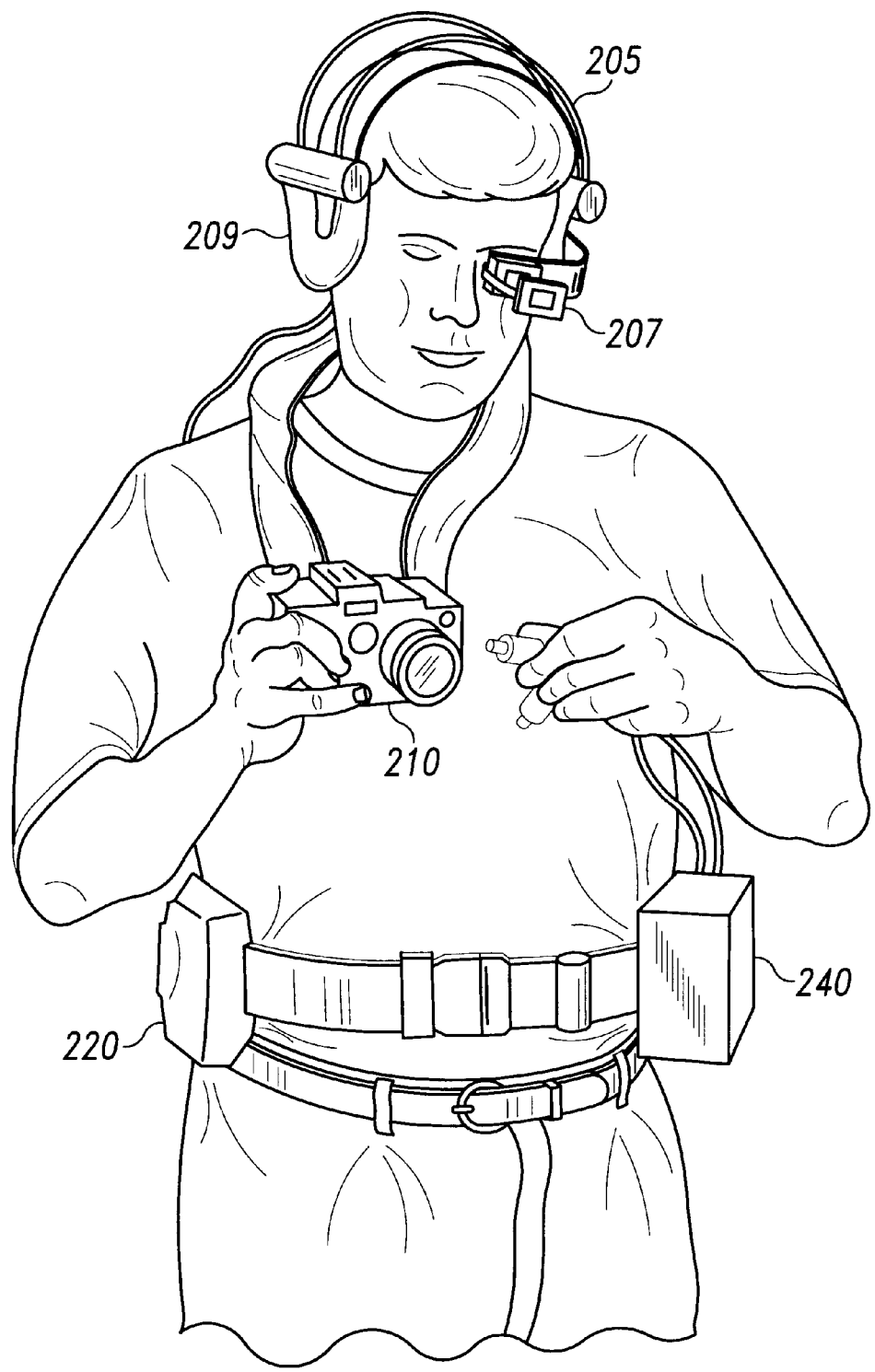
FIG. 3 is a perspective view of a person wearing a system according to the present invention.

FIG. 2 illustrates the physical form of the presently preferred embodiment, including the optional head display 160. The elements shown in FIG. 1 are shown in FIG. 2 with corresponding numbers; for example, the digital camera 110 is shown as 210 in FIG. 2. The hardware components shown in FIG. 1 are affixed to a harness 201 which is adapted to be worn by a user, in order to easily carry the hardware components of the system 100. A headset 205 is included in order to provide input/output, including system status and shutdown commands, for the user. The headset 205 shown has a eyepiece 207, and earphones 209. In certain embodiments, the headset 205 also includes a microphone. The battery pack 250 shown in FIG. 2 includes not only the battery 150, but an external battery for the camera 110. The wireless communications card is not visible in FIG. 2, as it is on the other side (and inside the case) of the CCU 120, but it's general location is indicated at 230. Though the various connecting cables are shown loose in FIG. 2 for visibility's sake, they are preferably affixed to the harness, to prevent tangling or snagging. Note that a power cable and the USB cable to the digital camera 110 are preferably ganged together, so the USB cable preferably returns to the harness 201 at the battery pack 150, then runs along the harness 201 back to the CCU 120. FIG. 3 illustrates how the system is worn by a user. It will be appreciated that, with the components distributed on the harness 201 as shown in FIGS. 2 and 3, the weight of the components is distributed approximately bilaterally symmetrically. The battery pack is not visible in FIG. 3, as it is behind the user, near the small of the back.

Figure 4:
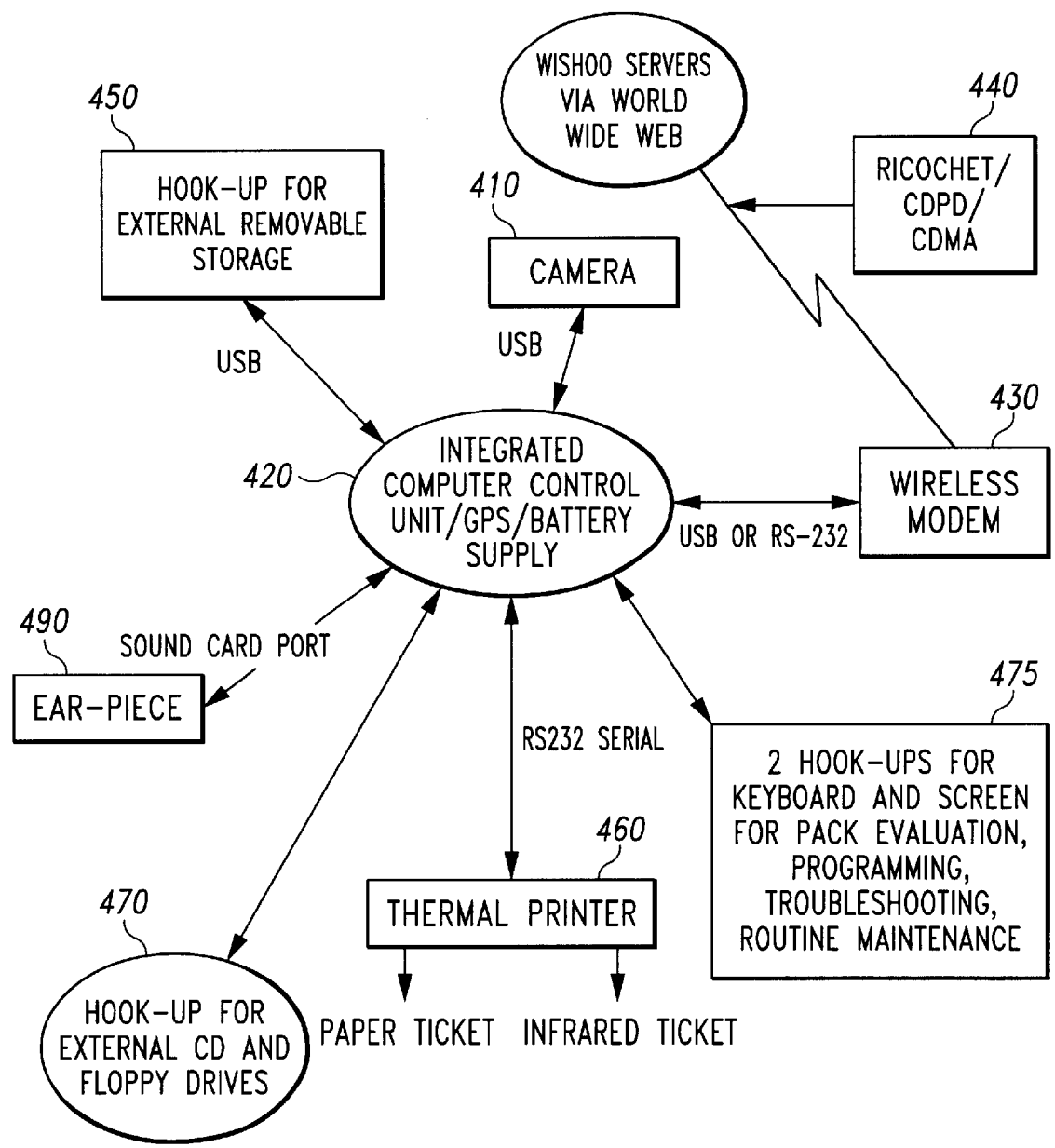
FIG. 4 is a block diagram of the system functions of a system according to the present invention.

FIG. 4 is a block diagram of the system functions of the system 100. At 410, the camera 110 captures images. The images are stored digitally (each using about ½ Megabyte), and displayed on an integral display device. The user views the captured images, and decides which should be saved and which should be discarded. When an image is captured that the user does not wish to save for distribution, the decision can be implemented by actuating a "reject" control on the camera 110. A decision to accept an image can be implemented either by actuating an "accept" control on the camera 110, or by doing nothing for 5 seconds, at which point the software defaults to "accept." The CCU 120 then pulls the digital image down from the camera's 110 memory via a USB port at 420. At that point, the digital image is no longer stored on the memory media of the camera 110. The CCU 120 gives the digital image a unique identifier. Preferrably the unique identifier is in the form of a 59 digit master number, in which 9 digits correspond to a unique customer ticket number (discussed further hereinbelow), a 3-digit receipt counter number, one digit to indicate high resolution or low resolution, and an 8-digit cycle redundancy check to aid in checking for errors due to wireless transmission. A low resolution duplicate image (approximately 25 kilobytes) is then generated, and assigned the corresponding unique identifier—that is, it has the same master number as the corresponding high resolution image, except for the digit indicating high or low resolution. The digital images and the unique identifiers are later passed in batches to the wireless data exchange component 130 via a USB or RS-232 serial port at 430, and are then transmitted to a web server (preferably using CDPD or CDMA) at 440. In the presently preferred embodiment, only the low-resolution images are transmitted, in order to avoid excessive bandwidth consumption. However, anticipated increases in wireless transmission bandwidth may make transmission of the high-resolution images more attractive in the future. In the presently preferred embodiment, the high resolution images are later transferred to external persistent media at 450, such as a zip drive or hard drive. In the preferred embodiment, this transfer is initiated automatically by the software when the external persistent media is connected to the CCU 120 via the camera 110's USB port. Preferably, this automatic transfer also transfers any remaining, untransmitted low resolution images. The CCU 120 then sends the unique identifier to the printer 140 via an RS-232 serial port. At 460, the printer 140 then generates a ticket including the 9-digit customer ticket number, text instructions, and a URL for a website controlled by the web server. Using the customer ticket number, a person can find and view the corresponding digital image at the website. The person can then email the image to others, print it, etc. The CCU 120 can also control an external CDROM and floppy drives at 470. Evaluation, programming, trouble-shooting, maintenance, etc., of the system 100, can be performed at 475, using an external keyboard, screen, that can be connected to the CCU 120. Information can also be stored in external, removeable storage media at 480, via a USB port. Also shown in FIG. 4 is the functionality for controlling an ear piece at 490 used in certain alternative embodiments, discussed further hereinbelow.

FIGS. 5A to 5F are flow charts showing certain details of the process flows running on the CCU. Each of these figures shows a separate thread of execution, each of which runs in parallel. Each is triggered by events issued by other threads and timers. Critical error messages are routed to the user and to the server at the next transaction.

Figure 5A:
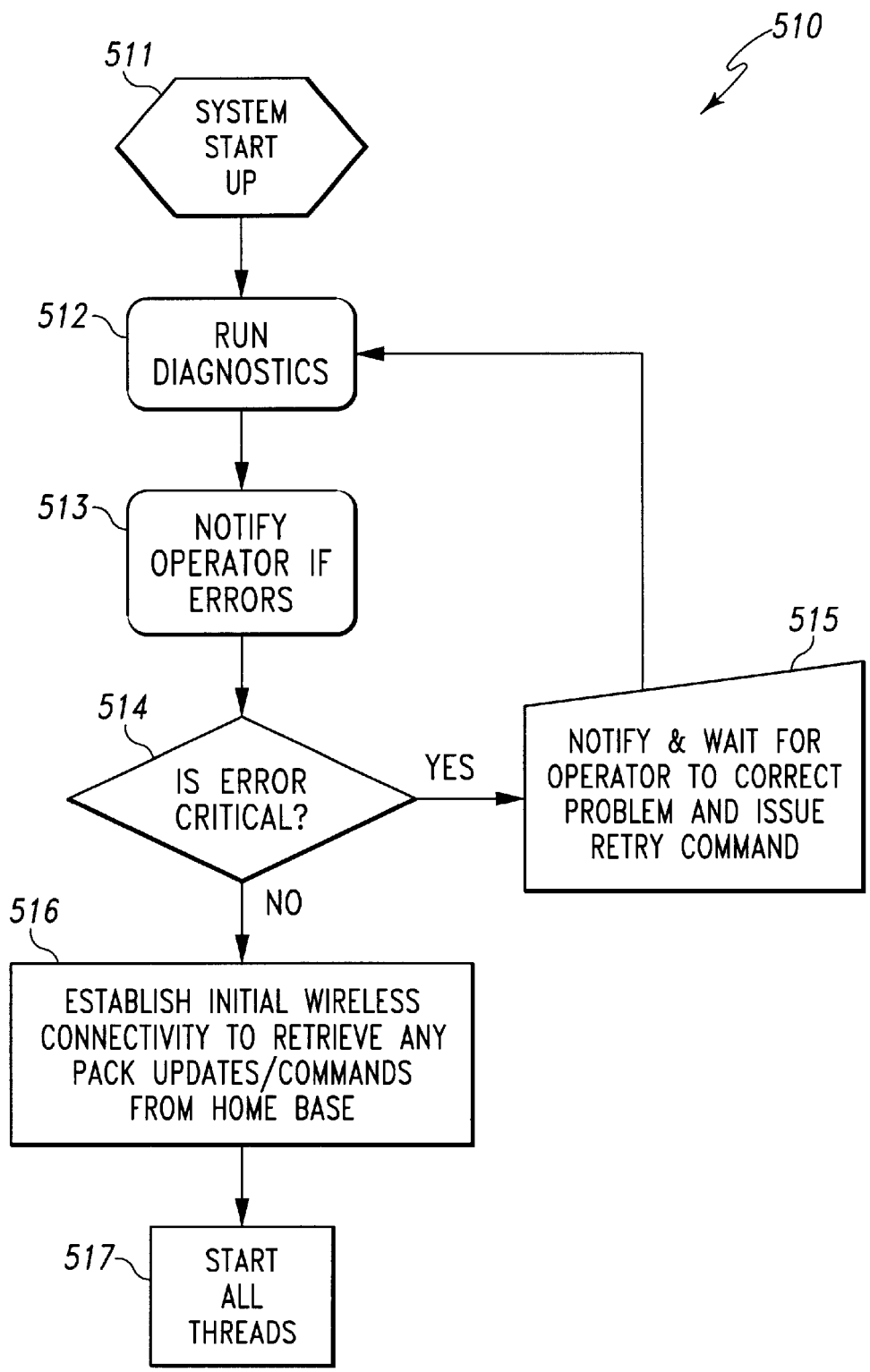
FIGS. 5A to 5F are flow charts showing certain details of process flows that are advantageously employed by a CCU in a system according to the present invention.

FIG. 5A shows the system start-up thread, shown generally at 510. The thread begins at 511. At 512 the thread 510 runs start-up diagnostics of the system 100. At 513, the user is notified of any errors via output to the CCU's 120 screen. At 514, a decision is made about whether an error is critical; if it is, at 515 the user is notified to permit correction of the problem, and start-up is suspended pending an instruction from the user to retry, at which point the thread returns to 512. If the decision at 514 is that no error is critical, instructions are issued to establish the initial wireless connection, in order to receive any updates or commands from the central server. At 517 all other threads are initialized. Various Tech Pack settings can be configured remotely. A PC or web-based utility can initiate update files and parameters that are sent to a common "landing zone" (an FTP server), where they wait for the Tech Pack in question to log into the "landing zone" and pull off the update parameters. Upon every Tech Pack start-up, and upon every subsequent wireless exchange, the Tech Pack will check the landing zone for any updates prior to uploading any images.

If update files are present the Tech Pack will "pull" these updates files off the landing zone and update its own parameters. These update files consist of, but are not limited too: INI file (Initialization file containing update parameters for the tech pack); format files (files that give the printer a blueprint of how to print out a specific tactical coupon configuration); PCX files (image files, i.e. files for the various images used for coupon offers found on the tactical coupons.) Additional parameters that can be updated via the INI (initialization file) include, but are not limited too: tactical coupon configuration (see update files above); resolution or size of the low resolution image to be created; high resolution image quality or resolution; the destination server; the number of images to be batched or time to wait prior to initiate upload of wireless images; the number of tries, or number of seconds to wait in attempting to log into the destination server; time between duplicate receipt timeout; size of image buffer (that is, the back-up of high resolution images after they have been pulled off local unit. In addition, other future parameters that may become pertinent may also be updated via the INI file update.

In addition, in the preferred embodiment, the local unit synchronizes it's time by comparing to an Atomic Clock via the Internet.

Figure 5B:
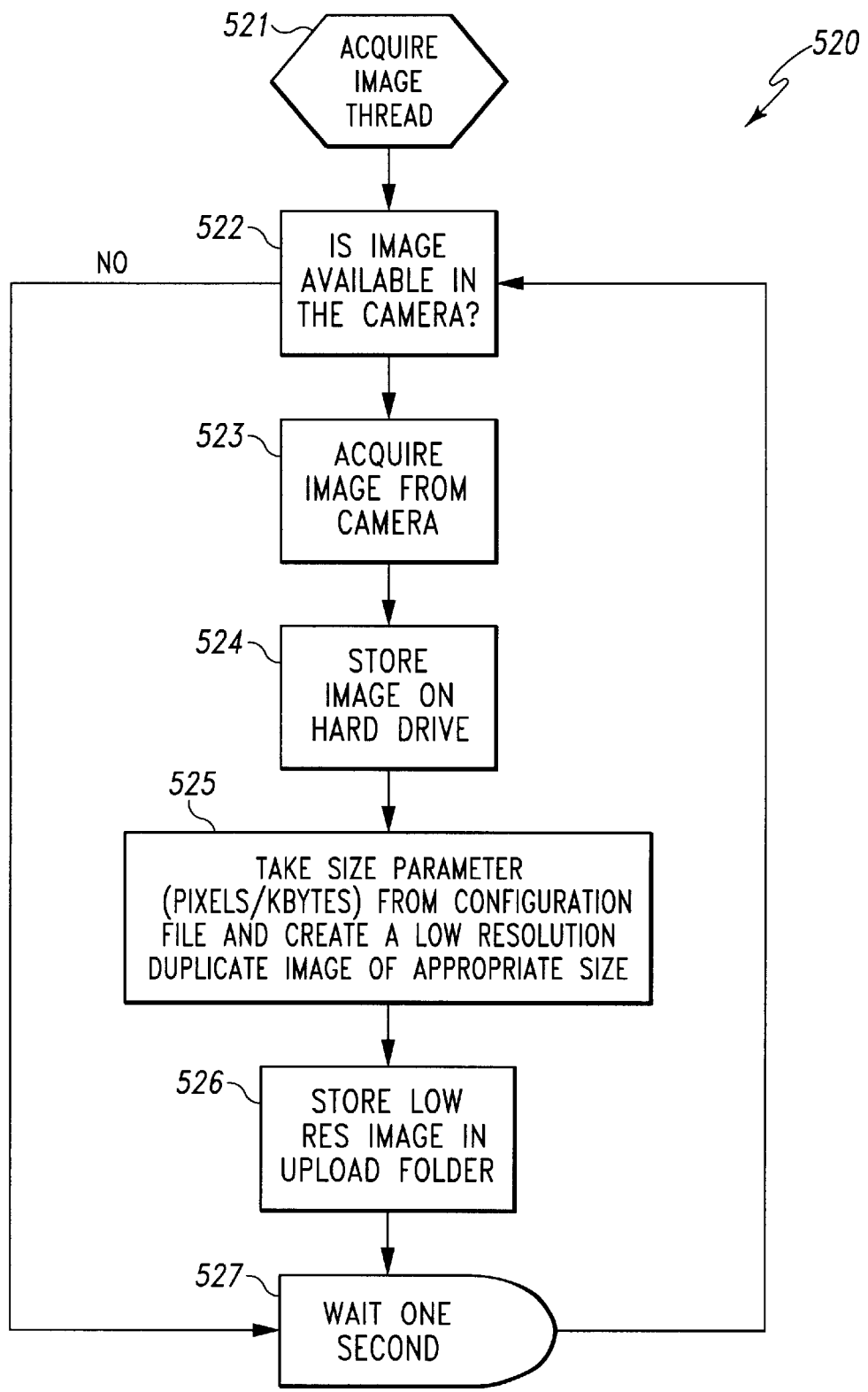

FIG. 5B shows the image acquisition thread, shown generally at 520. The thread 520 begins at 521. At 522 a decision is made about whether an image is available in the camera 110; if not, the thread 520 jumps to 527. If the decision at 522 indicates that there is an image available in the camera, at 523 the CCU 120 acquires the image from the camera 110. At 524 the CCU 120 stores the image in the persistent memory media. At 525 the CCU 120 takes size parameters including pixels and kilobytes from the configuration file and creates a low resolution duplicate image of the appropriate size. At 526 the CCU 120 stores the low resolution imagine in an uploaded folder for later batch transmission. At 527 the thread 520 pauses for 1 second and then returns to 522.

Figure 5C:
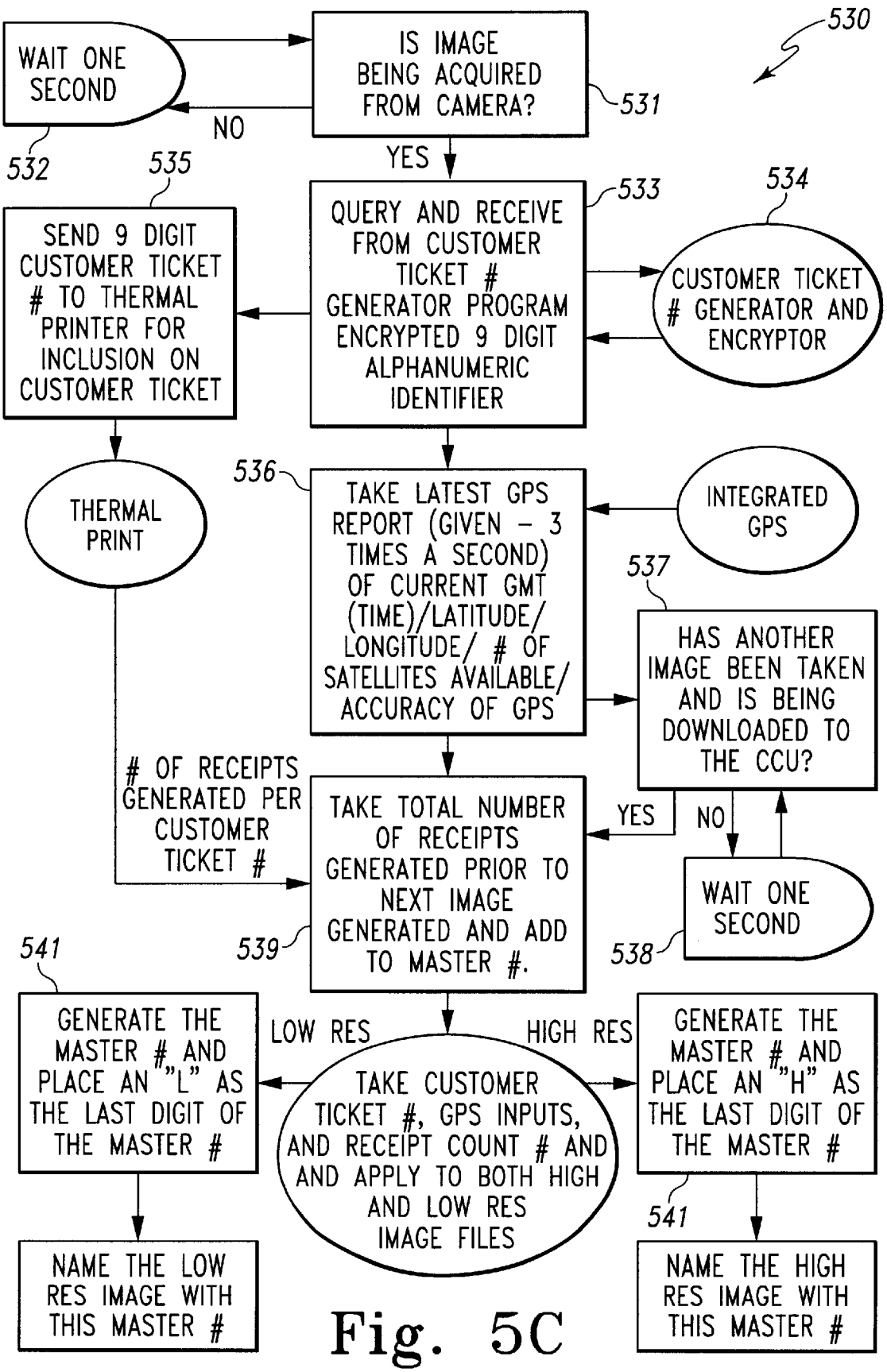

FIG. 5C shows the master number assignment thread, shown generally at 530. FIG. 5C includes optional steps used in those embodiments employing GPS information. The thread 530 begins at 531, by making a decision about whether an image is being acquired from the camera 110. If not, the thread 530 goes to 532. At 532 the thread 530 waits 1 second and returns to 531. If the decision at 531 indicates that an image is being acquired from the camera 110, then at 533 the thread 530 queries a customer ticket generator 534 for a 9-digit customer ticket number. The thread 530 then sends the 9 digit customer ticket number to the printer at 535. At 536 the GPS information is used to generate 38 additional digits of the master number identifying the time and location at which the associated image was captured. At 537 a decision is made about whether the printer has timed out since printing the last receipt or whether the digital camera 110 has captured a new image. If neither of these has occurred, then at 538 the thread waits one second. When one of these conditions is satisfied at 537, at 539 3 digits uniquely identifying the number of receipts that were printed for that image are added to the master number. Finally, at 541 an "H" is added to the master number for the high resolution version of the image, and an "L" is added to the master number of the low resolution version of the image.

Figure 5D:
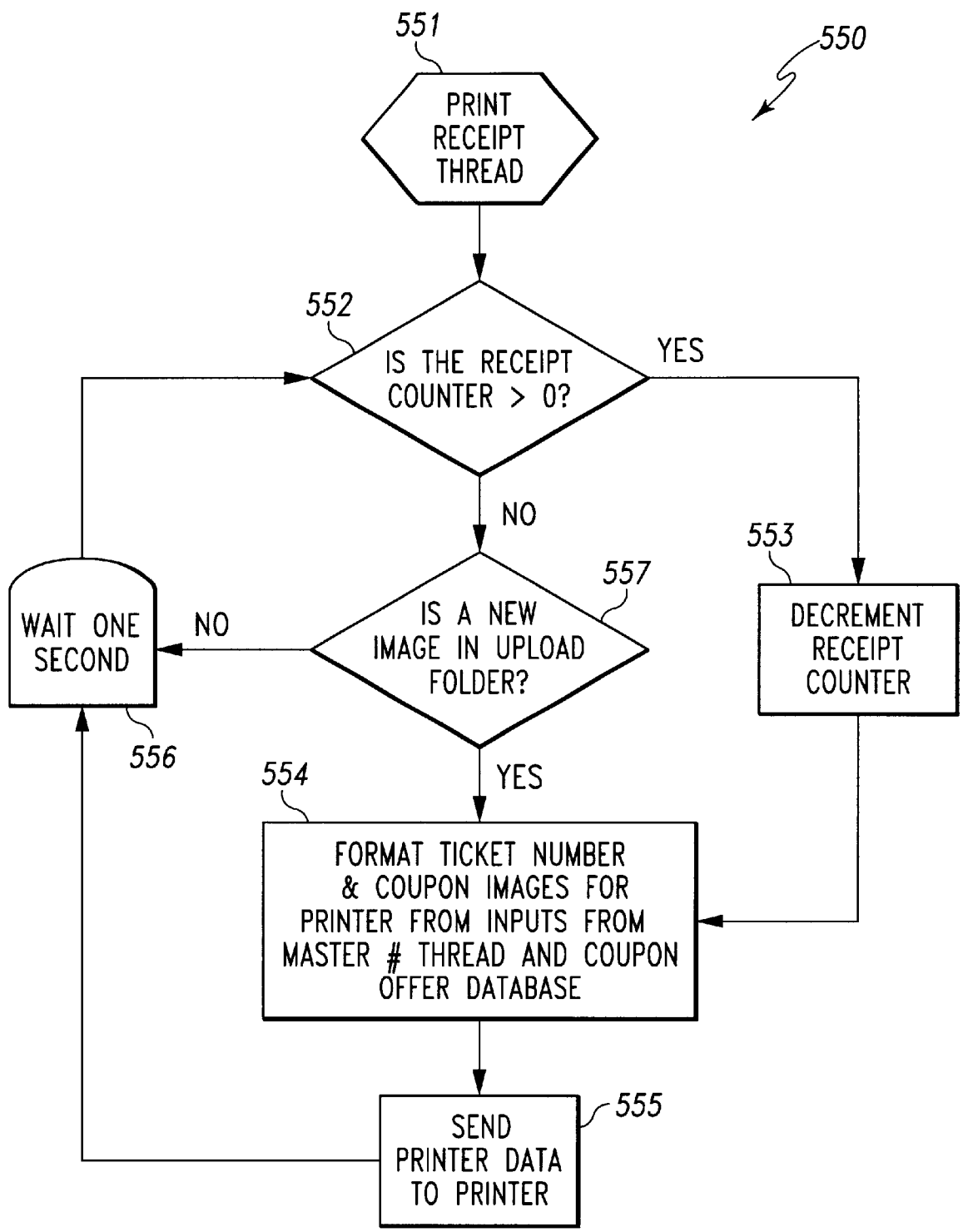

FIG. 5D shows the print receipt thread, shown generally at 550. The thread 550 begins at 551. At 552 a decision is made if a receipt counter exceeds 0. If it does the thread 550 proceeds to decrement the receipt counter at 553. At 554 the thread 550 formats the ticket number and coupon images for the printer 140 from inputs from the master number assignment thread 530 and coupon offer database. At 555 the format data is sent to the printer 140. At 556 the thread 550 waits 1 second then returns to 541. If the decision at 551 indicates that the receipt counter does not exceed 0, at 557 a decision is made if a new image is in the upload folder, and if not the thread 550 proceeds to 556. If the decision at 557 indicates that a new image is in the upload folder the thread 550 formats the ticket number at 554.

Figure 5E:
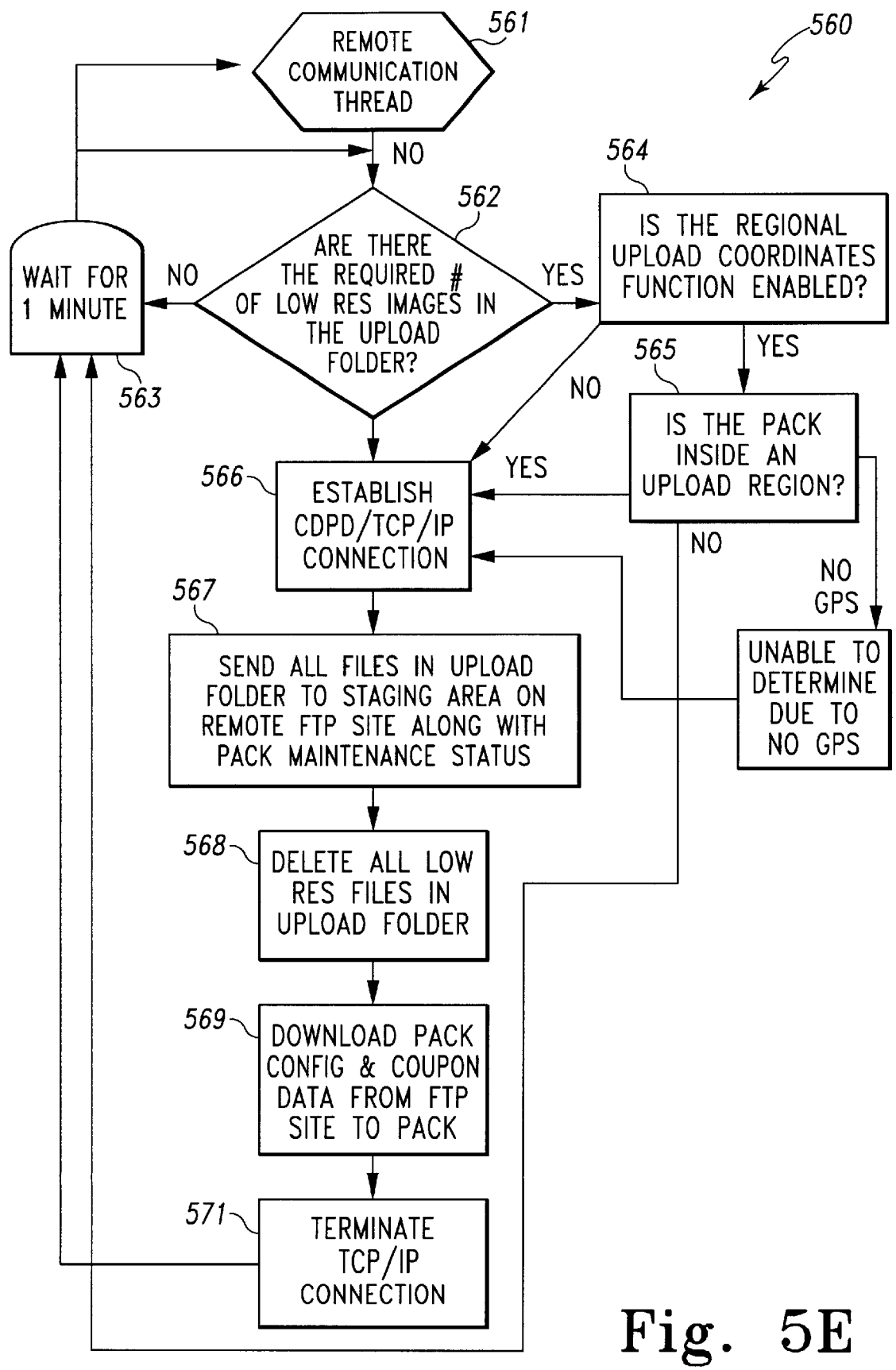

FIG. 5E shows the remote communication thread, indicated generally at 560. The thread 560 begins at 561. At 562 a decision is made if the required number of low resolution images are in the upload folder. If not, at 563 the thread 550 waits for 1 minute then returns to 561. If the decision at 561 indicates that there enough low resolution images in the upload folder, then at 564 a decision is made about whether a regional upload coordinates function is enabled. If it is, a decision is made at 565 about whether the system 100 is inside an upload region. If not, the thread 560 proceeds to 563. If the decision at 564 indicates the regional upload coordinates function is not enabled, or if the decision at 565 indicates that the system 100 is inside an upload region, at 566 the thread 560 establishes the wireless TCP/IP connection (such as CDMA or CDPD). At 567 the thread 560 then sends all files in the upload folder to the staging area on the remote FTP site along with the system 100 maintenance status. At 568 the thread 560 deletes all low resolution files in the upload folder. At 569 the thread 560 downloads pack configuration and coupon data from the FTP site. At 571 the thread 560 terminates the TCP/IP connection then proceeds to 563.

Figure 5F:
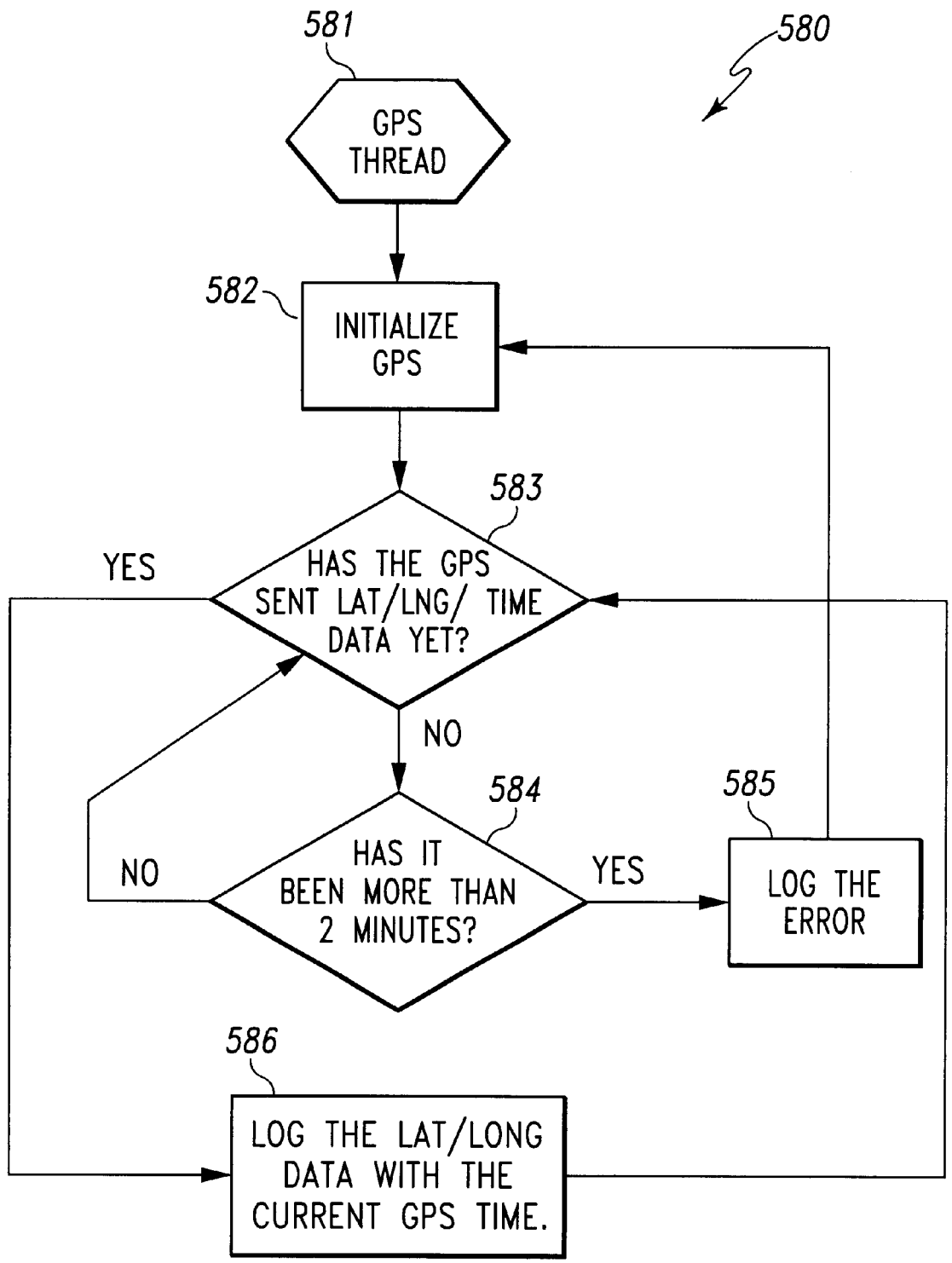

FIG. 5F shows the optional GPS thread, indicated generally at 580. The thread 580 begins at 581. At 582 the thread initializes the GPS. At 583 a decision is made about whether the GPS sent latitude, longitude, and time data yet. If not, a decision is made at 584 about whether it has been more than 2 minutes, and if not the thread 580 returns to 583. If the decision at 584 indicates that is has been more than 2 minutes, an error is logged at 585 and the thread 580 returns to 582. If the decision at 583 indicates that the GPS has sent latitude, longitude, and time data, at 586 the thread 580 logs the latitude and longitude data with the current GPS time and the process returns to 583.

In certain alternative embodiments additional hardware and functionality are included in a system for creating and distributing digital photographs according to the present invention.

In certain embodiments, the head-set includes a microphone, to permit voice commands to the CCU, such as an order to distribute a digital photograph. The head set can advantageously also include earphones or other speakers, in order to permit audio output. In certain embodiments, for example, the CCU can inform the user of the result of start-up diagnostics with voice statements such as "Technology Pack operational, ready to commence," or "Technology Pack Usable, but degraded due to [hardware error]." Similarly, other operations can be confirmed to the user by such audio output, including the start and successful completion of wireless transmissions, battery levels, memory and data storage levels, and shutdown operations.

In certain embodiments, the information contained on the coupons can also be output via other output devices. For example, in certain embodiments, the system includes an IR interface, suitable for exchanging data over relatively short distances with personal data assistant devices ("PDAs") or other similar devices. When a coupon is distributed to a person who has such a device, the information can be placed on it, either in addition to or in place of the printed coupon. It will be appreciated that other forms of output may also be used, and that additions or alterations to the output mechanisms can advantageously be adjusted in response to technological and market developments in digital technology.

In certain embodiments, the system further comprises a GPS system, such as the Garmin GPS Model 35-PC. In these embodiments, an additional thread is advantageously included in the system's 100 software (shown generally as 560 in FIG. 5F, and described in greater detail hereinbelow), and the master numbers advantageously include information identifying the location at which the corresponding picture was taken. In these embodiments, the system advantageously includes functionality to implement a method of tactical couponing, as described in U.S. Provisional Patent Application No. 60/231,908, the entire specification of which is hereby incorporated by reference. It will be appreciated that other suitable location-providing systems, existing or yet to be developed, can be employed by a system according to the present invention.

In those embodiments in which a Kodak DC 290 camera is used as the digital camera 110, the software that is in place "off the shelf" is advantageously replaced. It will be appreciated that this camera uses the Digital Operating System, which is an open source operating system. A suitable developer's kit can be purchased from Flashpoint, which maintains a website at Flashpoint.com. The primary advantage of replacing the software is to facilitate improved communication between the camera 110 and the CCU 120. With the off-the-shelf software, a download must be initiated by a button on the camera, and it takes approximately 8 seconds for the channel to be opened to the CCU 120 so that the download can begin. The replacement software advantageously permits ongoing communication between the CCU 120 and the camera 110, so that the download can be initiated by commands to the camera 110, and so the download can begin almost immediately upon the user's command.

The customized Digital application allows for the USB connection between CCU and camera to be almost always open. It will be appreciated by those skilled in the art that USB connections require substantial time to open. Since the off-the-shelf software requires opening and closing the USB connection each time an image is downloaded from the camera 110, over the course of the capture of a large number of images, this provides a substantial savings of time. In addition, the customized software provides for enhanced data communication between camera 110 and CCU 120. For example, the Tech Pack status is displayed via camera 110 menu screens (in addition to the CCU 120), and provides the ability to initiate different types of Tech Pack shutdowns (hard and soft) via camera 110 menu screens.

In certain alternative embodiments, other operating systems are used. For example, the various forms of Linux may also be used to develop appropriate software. It will be appreciated that any operating system and software that implements the functionality described herein can be used by a system according to the present invention.

In order to use the system 100, a user puts on the harness 201, which permits the easy carrying of the hardware components. The user can use the digital camera 110 to take digital pictures, which can be viewed on the digital camera's integral screen. In the preferred embodiment of the present invention a decision to download a digital photograph is implemented through input to the camera 110, which then controls the various functionalities necessary to distribute the digital image, as described herein. These functionalities are implemented as a plurality of software threads that run in parallel, so that the process can be completed more rapidly. In the preferred embodiment, for example, when the user indicates the desire to distribute an image that has been captured by the camera 110, without waiting for the image to be downloaded to the CCU, the CCU generates the coupon that will be given to the consumer, and then instructs the printer to generate the coupon. In an embodiment employing a Kodak DC 290 camera, a Xybernaut MA IV, and a Zebra Comtec Encore 2 Direct thermal printer, this process takes approximately 4 seconds to complete. While the coupon is being generated and printed, the MA IV downloads the corresponding digital image to its flash memory, which takes approximately 15 seconds to complete. Independent of these operations, the system 100 prepares low-resolution versions of the images for batch-transmission to a home base, which can then be made available on the Internet.

The system 100 generates two unique identification number for each image for which at least one receipt is printed (one for the high resolution version and one for the low resolution version). Each receipt printing contains at least the 9-digit unique portion of that number, which permits them to find and view the associated images online. There, they can order tee shirts, mugs, high-quality prints, or other such things having the corresponding image thereon.

In addition, in the preferred embodiment, each receipt includes a coupon offer, preferably selected according to a tactical couponing methed. Since the system 100 can incorporate time and GPS location information, such a tactical couponing method can provide coupons with the best possible chance to be of interest to the persons receiving them.

It will be appreciated that the Tech Pack automates the process of image acquisition, image duplication, image transfer, coupon generation, and image naming, and overall image management. All of these processes are done automatically by the Tech Pack, eliminating manual intervention by operator. Settings and parameters are configured remotely, thereby providing a fast and convenient system and method for capturing and distributing digital images.

In addition to allowing for commerce activities such as sale of prints, T-shirts, coffee mugs, etc., a system and method according to the present invention facilitate gathering of demographic data on consumers. Once consumers receive ticket and log onto web site annotated on ticket, prior to retrieving their image they are asked to supply some data. In addition, during the process of sending free digital greetings with their image as the centerpiece, they can be given the chance to "opt-in" or participate in various additional data gathering activities.

While the invention has been illustrated and described in detail in the drawings and foregoing description, the same is to be considered as illustrative and not restrictive in character, it being understood that only the preferred embodiment, and certain other embodiments deemed helpful in further explaining how to make or use the preferred embodiment, have been shown. All changes and modifications that come within the spirit of the invention are desired to be protected.

We claim:

1. A system comprising:

a harness;

a digital camera affixed to the harness;

a computer control unit affixed to the harness;

a wireless data exchange component affixed to the harness;

a printer affixed to the harness; and a battery affixed to the harness;

wherein the computer control unit begins a process of printing a coupon associated with a digital photograph before the digital photograph has been completely downloaded from the digital camera.

* * * * *